United States Patent Office 3,196,111
Patented July 20, 1965

3,196,111
TANTALUM CAPACITOR ELECTROLYTE
Norman F. Jackson, Northampton, England, assignor to The Plessey Company Limited, Ilford, England, a company of Great Britain
No Drawing. Filed Nov. 15, 1962, Ser. No. 238,055
Claims priority, application Great Britain, Nov. 23, 1961, 41,925/61
3 Claims. (Cl. 252—62.2)

This invention relates to a capacitor and is more particularly concerned with a tantalum capacitor which is intended for operating at high voltages.

It is an object of the present invention to provide an improved operating electrolyte for tantalum capacitors which is capable of working at high temperatures.

Broadly in accordance with the present invention the operating electrolyte for a tantalum capacitor includes N,N-dimethylformamide.

Broadly in accordance with a further aspect of the invention the electrolyte is N,N-dimethylformamide which may contain up to 5% by weight of water with dissolved oxalic acid to provide the desired conductivity. An organic phosphate such as triethyl phosphate is also added to the solution to inhibit field crystallization of anodic tantalum oxide films. Field crystallization is a term used to describe crystallization of the amorphous anodic oxide film which can occur due to the effect of the applied voltage on the capacitor.

For a better understanding of the invention a typical electrolyte composition for use in a capacitor for operation at 300 volts will be described. This composition consists of a mixture of 2% by weight of oxalic acid in N,N-dimethylformamide to which 5% by weight of triethyl phosphate has been added.

The solution of the oxalic acid may be facilitated by the presence of a small quantity of water. Up to about 5% by weight of water may even be added to dry N,N-dimethylformamide to achieve this. It is believed that the oxalic acid exists in the solution in the form of quaternary ammonium complexes. After heating the mixture to react the oxalic acid with the N,N-dimethylformamide the conductivity of the solution was $2.0 \times 10^{-3}$ specific mhos. It has been found that an important aspect of an electrolyte resides in its ability to retard the detrimental effects of field crystallization in the tantalum oxide layers provided on the anodes of tantalum capacitors.

The following table provides a comparison between the extent of field crystallization of capacitor anodes using this electrolyte and other electrolytes:

| | Electrolyte Composition | Electrolyte Conductivity (Specific mhos × 10³) | Capacitor Performance |
|---|---|---|---|
| A | 1.66% sulphuric acid, 78.6% butyl carbitol, 19.7% water in proportions by weight. | 2.5 | Field crystallization starts after 25 hours' storage at 60° C. with 300 v. applied. |
| B | 100.0 gm. boric acid, 49.1 ml. glycol, 83.3 ml. ammoniacal glycol (72 gm. ammonia/litre), 29.2 gm. mannitol. Mixture heated to 130° C. before use. | 0.33 | Field crystallization starts after 20 hours' storage at 125° C. with 300 v. applied. |
| C | 2% oxalic acid, N,N-dimethylformamide, 5% triethyl phosphate in proportions by weight. | 2.0 | Field crystallization starts after 20 hours' storage at 125° C. with 300 v. applied. However, the rate of growth of the crystalline phase is much lower. |

Compositions A and B represent said other electrolytes and Composition C an electrolyte in accordance with the invention.

It was observed that the rate of growth of a crystalline phase in Composition C is much lower than that observed with capacitors filled with Composition A or the ammonium-glycol-mannitol-borate electrolyte given at B in the table. Other mixtures of oxalic acid and N,N-dimethylformamide, containing additions of triethyl phosphate up to a maximum of 5% by weight, have delayed the start of field crystallization by several hundred hours.

Another convenient electrolyte composition is as follows: A boiled mixture of 2% oxalic acid and 0.5% triethyl phosphate, 97.5% N,N-dimethylformamide in proportions by weight.

A basic electrolyte which permitted long periods of use before field crystallization occurred was prepared as follows:

A mixture of 50.4 gm. of oxalic acid hydrate and 29.2 gm. of N,N-dimethylformamide was boiled for 30 minutes under reflux. To the white crystalline solid which formed on cooling a further 95.4 gm. of N,N-dimethylformamide were added and the mixture again boiled for 30 minutes. After cooling to room temperature the solid portion was filtered off and the liquid diluted with additional N,N-dimethylformamide to give a conductivity of $3.0 \times 10^{-3}$ specific mhos at 20° C. This solution was boiled under reflux for 8 hours. At this stage the liquid had a conductivity of $1.1 \times 10^{-3}$ specific mhos at 20° C.

To portions of this basic mixture 0.5% and 5% quantities by weight of triethyl-phosphate were added and the mixtures boiled for a further 30 minutes. Upon cooling the conductivities of the resulting solutions were 1.1 and $1.2 \times 10^{-3}$ specific mhos, respectively.

Tantalum capacitors filled with these two electrolytes and stored at 125° with 300 v. applied field crystallized after 150 and 500 hours respectively.

What I claim is:

1. An electrolyte for a tantalum capacitor consisting essentially of N,N-dimethylformamide, which may contain up to 5% by weight of water, 2% by weight of oxalic acid and between 0.5% and 5% by weight of triethyl phosphate.

2. An electrolyte for a tantalum capacitor consisting essentially of a mixture of 97.5% by weight of N,N-dimethylformamide, 2% by weight of oxalic acid and 0.5% by weight of triethyl phosphate.

3. A method of making an electrolyte for a tantalum capacitor which comprises the steps of boiling under reflux a mixture consisting essentially of 50.4 gm. of oxalic acid hydrate and 29.2 gm. of N,N-dimethylformamide, adding a further 95.4 gm. of N,N-dimethylformamide and continuing boiling, cooling the mixture to room temperature, separating off liquid and to this liquid adding further N,N-dimethylformamide until its conductance reaches $3.0 \times 10^{-3}$ specific mhos at 20° C., boiling again and adding between 0.5% and 5% by weight of triethyl phosphate, boiling and cooling to room temperature.

References Cited by the Examiner
UNITED STATES PATENTS
2,923,867  2/60  Robinson _____ 252—62.2
2,965,816  12/60  Ross _____ 252—62.2

FOREIGN PATENTS
557,327  5/57  Belgium.

TOBIAS E. LEVOW, *Primary Examiner.*
MAURICE A. BRINDISI, *Examiner.*